(12) United States Patent
Boschert et al.

(10) Patent No.: US 10,571,872 B2
(45) Date of Patent: Feb. 25, 2020

(54) METHOD FOR COMPUTER-AIDED CONTROL OF AN AUTOMATION SYSTEM

(71) Applicant: SIEMENS AKTIENGESELLSCHAFT, München (DE)

(72) Inventors: Stefan Boschert, Neubiberg (DE); Lucia Mirabella, Plainsboro, NJ (US); Birgit Obst, München (DE); Utz Wever, München (DE)

(73) Assignee: SIEMENS AKTIENGESELLSCHAFT (DE)

( * ) Notice: Subject to any disclaimer, the term of this patent is extended or adjusted under 35 U.S.C. 154(b) by 391 days.

(21) Appl. No.: 15/336,850

(22) Filed: Oct. 28, 2016

(65) Prior Publication Data

US 2017/0123387 A1    May 4, 2017

(30) Foreign Application Priority Data

Nov. 3, 2015 (EP) ..................... 15192771

(51) Int. Cl.
*G05B 11/32* (2006.01)
*G05B 13/04* (2006.01)

(52) U.S. Cl.
CPC ............ *G05B 13/042* (2013.01); *G05B 11/32* (2013.01); *G05B 2219/35499* (2013.01)

(58) Field of Classification Search
None
See application file for complete search history.

(56) References Cited

U.S. PATENT DOCUMENTS

| | | | | |
|---|---|---|---|---|
| 5,825,981 A * | 10/1998 | Matsuda | .......... | G05B 19/41815 700/248 |
| 5,909,674 A * | 6/1999 | Schaffer | .......... | H05K 13/08 700/173 |
| 6,470,301 B1* | 10/2002 | Barral | .......... | B25J 9/1666 703/1 |
| 2002/0156542 A1* | 10/2002 | Nandi | .......... | G05B 13/042 700/30 |
| 2006/0241791 A1* | 10/2006 | Pokorny | .......... | G05B 17/02 700/67 |
| 2006/0276934 A1* | 12/2006 | Nihei | .......... | B25J 9/1656 700/245 |

(Continued)

FOREIGN PATENT DOCUMENTS

| | | |
|---|---|---|
| EP | 1420153 A2 | 5/2004 |
| WO | WO 2007067645 A2 | 6/2007 |

*Primary Examiner* — Thomas C Lee
*Assistant Examiner* — Gary Collins
(74) *Attorney, Agent, or Firm* — Schmeiser, Olsen & Watts LLP

(57) ABSTRACT

A method for computer-aided control of an automation system is provided by use of a digital simulation model which simulates the automation system and which is specified by a number parameters comprising a number of configuration parameters) describing the configuration of the automation system and a number of state parameters describing the operational state of the automation system. Simulated operation runs of the automation system based on the simulation model can be performed with the aid of a computer, where a simulation run predicts a number of performance parameters of the automation system.

13 Claims, 3 Drawing Sheets

(56) References Cited

U.S. PATENT DOCUMENTS

| | | | |
|---|---|---|---|
| 2009/0204245 A1* | 8/2009 | Sustaeta | G05B 13/024 700/99 |
| 2009/0265157 A1* | 10/2009 | Piepenbrock | G05B 19/05 703/21 |
| 2010/0082120 A1 | 4/2010 | Collete, III | |
| 2010/0082312 A1 | 4/2010 | Budaraju | |
| 2011/0240439 A1* | 10/2011 | Rompe | G06T 7/0004 198/341.01 |
| 2013/0185039 A1* | 7/2013 | Tesauro | G06Q 10/063 703/6 |
| 2014/0135947 A1* | 5/2014 | Friman | G05B 23/0267 700/29 |
| 2014/0148949 A1* | 5/2014 | Graca | G05B 19/41815 700/248 |
| 2015/0066400 A1* | 3/2015 | Schmidt | G05B 11/36 702/60 |
| 2015/0184550 A1 | 7/2015 | Wichmann et al. | |
| 2016/0160627 A1* | 6/2016 | Aitken | G05B 13/048 700/90 |

* cited by examiner

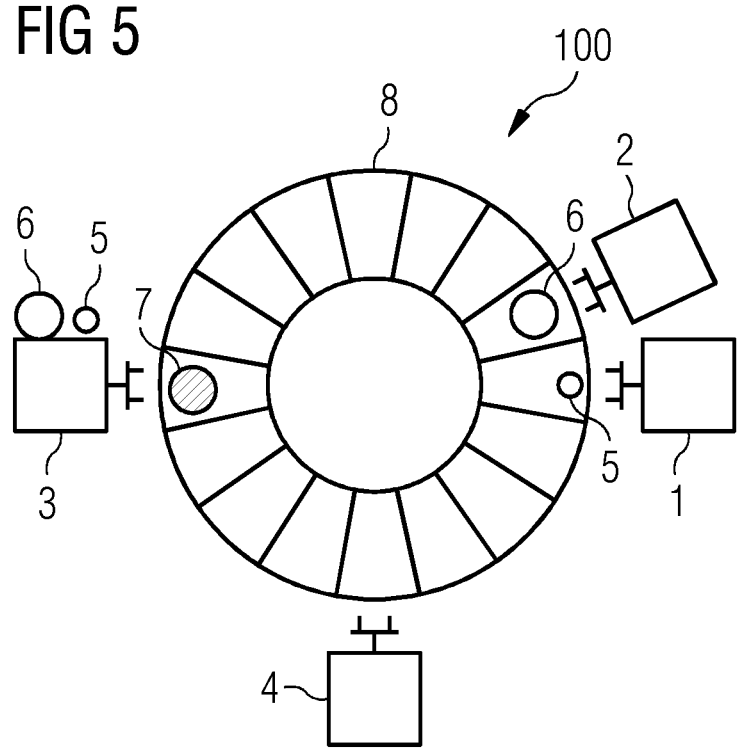

METHOD FOR COMPUTER-AIDED CONTROL OF AN AUTOMATION SYSTEM

CROSS-REFERENCE TO RELATED APPLICATIONS

This application claims priority European application No. 15192771.2 having a filing date of Nov. 3, 2015, the entire contents of which are hereby incorporated by reference.

FIELD OF TECHNOLOGY

The following refers to a method for computer-aided control of an automation system.

BACKGROUND

Modern automation systems allow a very flexible configuration of corresponding parameters in the system leading to a high variation and complexity in the process performed by the automation system. E.g., in automated production systems, the position of machines at conveyor belts as well as the processing times of those machines or even the sequential arrangement of the machines can be changed. With a dynamically changing configuration based on actual resources and operational conditions, the control of an automation system during operation is difficult and may result in undesired operational states, such as a blocked production in a production system.

SUMMARY

Therefore, an aspect relates to a method for computer-aided control of an automation system allowing a flexible change of its configuration during operation and avoiding undesired operational states.

The method of embodiments of the invention control an automation system in real operation by use of a digital simulation model which simulates the automation system and which is specified by a number of configuration parameters (i.e. at least one configuration parameter) describing the configuration of the automation system and a number of state parameters (i.e. at least one state parameter) describing the operational state of the automation system. Such simulation models are well-known in the state of the art. Simulated operation runs of the automation system based on the simulation model can be performed with the aid of a computer, where a simulation run predicts a number of performance parameters of the automation system.

The above mentioned configuration parameters refer to parameters which can be adapted (intentionally) in the automation system. Contrary to that, the above mentioned state parameters cannot be adapted and are not configurable. The state parameters can be measured/sensed and describe the current operational state of the automation system. Examples of state parameters are the allocation of a conveyor belt, the actual processing time at a machine producing parts and so on. Depending on the circumstances, the above mentioned performance parameters may be defined based on different performance measures. Preferred embodiments of performance parameters and configuration parameters will be mentioned below.

In the method of embodiments of the invention, the following steps a) to c) are performed at each processing event of a plurality of successive predetermined processing events during the real operation of the automation system. A processing event is characterized by a predetermined point in time at which the execution of steps a) to c) is initialized.

In step a), the values of the number of state parameters of the automation system are sensed/measured. I.e., the current values of the state parameters are determined. Furthermore, a simulated operation run based on the simulation model specified by the number of configuration parameters and the number of sensed state parameters is performed. In step b), it is checked whether one or more predetermined performance parameters out of the number of performance parameters predicted by the simulated operation run in step a) do fulfil a performance criterion with respect to a minimum performance of the automation system. This performance criterion may be defined in various ways and examples of performance criteria will be given below. The performance criterion is fulfilled in case that at least a minimum performance of the automation system is given based on the predetermined performance parameters.

If the one or more predetermined performance parameters do not fulfil the performance criterion, the simulation model is adapted by changing one or more predetermined configuration parameters (e.g. all configuration parameters) out of the number of configuration parameters such that the one or more predetermined performance parameters predicted by a simulated operation run based on the adapted simulation model fulfil the performance criterion. Hence, in this step b), the changed configuration parameters are checked with respect to the fulfilment of the performance criterion based on the adapted simulation model. The determination of changed configuration parameters may be done by different methods and particularly by an optimization of the simulation model as will be described below.

After having determined appropriately changed configuration parameters in the simulation model, the one or more predetermined configuration parameters of the automation system in real operation are adjusted in step c) to those changed predetermined configuration parameters.

The method of embodiments of the invention enables a flexible change of the configuration of an automation system during real operation by using a simulation model initialized with the actual system state (i.e. corresponding state parameters) and by forecasting performance parameters and checking the fulfilment of a performance criterion. Hence, the method of embodiments of the invention avoids undesired operational states of the automation system.

In a preferred embodiment of the invention, the one or more changed predetermined configuration parameters are determined in step b) by an optimization of the simulation model, the optimization having the optimization goal of finding the optimum of the one or more predetermined performance parameters with respect to the performance criterion in dependence on the one or more predetermined configuration parameters as variables.

In a preferred embodiment of the invention, the optimization of the simulation model comprises a deterministic optimization where at least one predetermined configuration parameter has a deterministic value as variable. Preferably, all predetermined configuration parameters have deterministic values as variables. Alternatively or additionally, the optimization of the simulation model comprises a probabilistic optimization where at least one predetermined configuration parameter is described by a mean value as a variable and a fixed standard deviation of the mean value. Preferably, all predetermined configuration parameters each are described by a mean value as a variable and a fixed standard deviation of the mean value. Deterministic and probabilistic optimization methods are well-known for a skilled person. Probabilistic optimization is more robust against the variation of parameters.

The method of embodiments of the invention may be used for any automation system. In a particularly preferred embodiment, the invention is used for an automation system in the form of a production system. In this case, the one or more predetermined performance parameters preferably comprise the production time for a number of products (i.e. at least one product) produced by the production system where a necessary condition and optionally the only condition for the non-fulfilment of the performance criterion is that the production time is higher than a predetermined threshold or results in a dead lock where no more products can be produced.

In another embodiment of the invention, the one or more predetermined performance parameters comprise the quality for a number of products produced by the production system where a necessary condition and optionally the only condition for the non-fulfilment of the performance criterion is that the quality for the number of products is lower than a predetermined threshold.

In another embodiment of the invention, the one or more predetermined performance parameters comprise the electric energy consumption of the automation system where a necessary condition and optionally the only condition for the non-fulfilment of the performance criterion is that the electric energy consumption is higher than a predetermined threshold.

In a particularly preferred embodiment of the method according to the invention, the number of state parameters of the automation system in real operation is sensed in step a) by one or more cameras.

In another embodiment of the invention, the automation system comprises a number of machines where the one or more predetermined configuration parameters comprise for one or more of the number of machines the processing time of at least one processing step performed by the respective machine and/or the position of the respective machine within the automation system. The term machine is to be interpreted broadly and may e.g. comprise a robot.

In another embodiment of the invention, a suitable initialization of the automation system is done by a corresponding optimization of the above mentioned simulation model. To do so, before the start of the real operation of the automation system, an optimization of the simulation model is performed, the optimization having the optimization goal of finding the optimum of the one or more predetermined performance parameters with respect to the performance criterion in dependence on the one or more predetermined configuration parameters as variables. As described above, a deterministic and/or probabilistic optimization may be used.

Besides the above described method, embodiments of the invention refers to an apparatus for computer-aided control of an automation system, where the apparatus comprises means to perform the method of embodiments of the invention or one or more preferred embodiments of the method of the invention.

Furthermore, embodiments of the invention comprise a computer program product with program code, which is stored on a machine-readable carrier, for carrying out the method of embodiments of the invention or one or more preferred embodiments of the method of the invention when the program code is executed on a computer.

Moreover, embodiments of the invention refers to a computer program with program code for carrying out the method of embodiments of the invention or one or more preferred embodiments of the method of the invention when the program code is executed on a computer.

BRIEF DESCRIPTION

Some of the embodiments will be described in detail, with reference to the following figures, wherein like designations denote like members, wherein:

FIG. 5 is a schematic plan view of the automation system from FIG. 1 with optimized configuration parameters.

DETAILED DESCRIPTION

Figure 1:
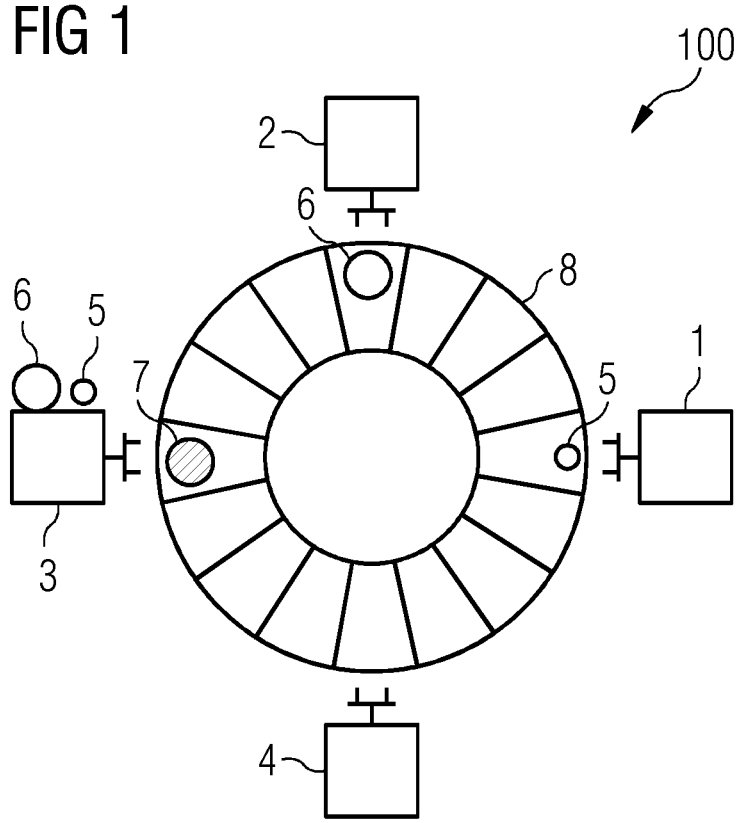
FIG. 1 shows a schematic plan view of an example of an automation system controlled by an embodiment of the invention.

An embodiment of the invention will now be described with respect to an automation system of the type shown in FIG. 1. However, the embodiments of the invention are also applicable for other types of automation systems. The automation system 100 of FIG. 1 is a production system comprising four robots 1, 2, 3 and 4 arranged around a circular conveyor belt 8 having 16 segments. The production system of FIG. 1 has the purpose to produce parts 5 and 6 and assemble these parts in order to obtain the final product 7. Each of robots 1 to 4 has intelligence to react flexibly on changes in the production process. Robot 1 produces part 5 and puts this part on the conveyor belt 8. Robot 2 produces part 6 and also puts this part on the conveyor belt 8. Robot 3 collects parts 5 and 6 from the conveyor belt 8 in order to assemble these parts to obtain the product 7. The assembled product 7 is put back on the conveyor belt by robot 3. Finally, robot 4 gathers the assembled product 7 and takes it from the belt. The conveyor belt 8 moves in counter clock-wise direction.

In the following, the production system of FIG. 1 shall be controlled such that dead locks of the production system do not occur. A dead lock is a state of the production system in which it is no longer possible to produce further products. In such a situation, the production system runs into saturation and the production is blocked.

In the embodiment described herein, there exists a digital simulation model SM (FIG. 2) of the production system stored in a controller of the system where the controller comprises a computer which can predict the production time for 20 products 7 based on configuration parameters and current state parameters of the production system by the use of the simulation model SM. This production time is a performance parameter in the sense of the patent claims. For the simulation model SM, the following assumptions are made:

the conveyor belt 8 has a given number of positions (i.e. 16 segments) for parts to be transported;
the conveyor belt 8 has a fixed belt velocity;
the position of the robots 1 to 4 is freely configurable and given by the position number (i.e. segment number) of the conveyor belt;
the time a robot needs for producing a part is measured in number of positions of the belt divided by the belt velocity (;

the configuration parameters which may be adjusted in the production system are the positions of the robots with respect to the conveyor belt and the processing time of robots 1 to 3 for the respective part 5 to 7 (limited to a minimum time value which can be increased). Depending on the circumstances, only the adjustment of some of those configuration parameters may be allowed in the production system.

FIG. 1 shows a basic configuration of the production system where the robots 1 to 3 are positioned uniformly around the conveyor belt 8. In this configuration, robot 1 is located at position 1 of the belt and needs 8 time segments for producing the part 5. Here and in the following, a time segment corresponds to the time of one complete rotation of the conveyor belt divided by 16. Furthermore, robot 2 is located at position 5 of the belt and needs 9 time segments for producing the part 6. Moreover, robot 3 is located at position 9 of the belt and needs 11 time segments for producing product 7 (i.e. for assembling parts 5 and 6). At position 13 of the belt, the fourth robot 4 is located which picks up the assembled product 7 from the conveyor belt. No processing time is assigned to this robot.

Based on the above mentioned simulation model, the production time for 20 products in the system of FIG. 1 is 371 time segments which corresponds to 23.2 rotations of the conveyor belt. Taking into account a realistic variation of one time segment for the production time of each of the robots 1 to 3, Monte Carlo computations applied to the simulation model lead to an expectation value for the production time of 372.1 segments with a standard deviation of 8.2. Though this configuration is stable with respect to the final production time due to a small standard deviation, this configuration is not stable concerning the operation itself. This is because 526 out of 4000 runs of the Monte Carlo computations resulted in a dead lock due to an occupied conveyor belt. In other words, for 526 runs, an infinite production time was derived. According to the embodiment described in the following, this non-optimal configuration shown in FIG. 1 is adapted during the real operation of the production system in order to avoid dead locks.

Figure 2:
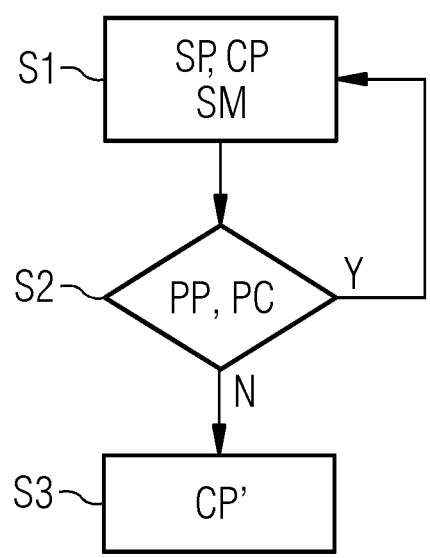
FIG. 2 is a flow chart illustrating an embodiment of a control method according to an embodiment of the invention.

FIG. 2 shows a flow chart describing an embodiment of the control method according to the invention with respect to the production system of FIG. 1. The above mentioned configuration parameters of the system are designated as CP. In regular intervals during the operation of the production system, steps S1 to S3 are performed at a corresponding processing event. In step S1, the current operational state of the production system described by a number of state parameters SP is sensed by a camera system. These state parameters SP comprise the current allocation of the conveyor belt as well as the consumed processing time for the actual produced part for each of the robots 1 to 3. Based on these sensed state parameters SP together with the configuration parameters CP, the above mentioned simulation model SM is used in order to perform a simulation run for determining a performance parameter PP in the form of the overall production time for 20 products.

In step S2 of FIG. 2, it is determined whether this production time fulfils a performance criterion PC based on a threshold for the production time. In other words, the performance criterion is fulfilled when the production time is below the predetermined threshold. In a preferred embodiment, the threshold is set so high that the non-fulfilment of the performance criterion corresponds to a dead lock. In case that the performance criterion PC is fulfilled (branch Y), no changes are made for the configuration parameters and the next step S1 at the next processing event is awaited. In case that the performance criterion PC is not fulfilled (branch N), the method goes to step S3 and adjusts some of the configuration parameters CP in the simulation model SM, resulting in changed configuration parameters CP'. The changed configuration parameters CP' are determined such that the performance criterion PC is fulfilled when simulating the production system with the simulation model taking into account the changed configuration parameters.

In the embodiment described herein, a deterministic optimization of the simulation model SM with respect to the optimization goal of a low production time is performed in order to determine the changed configuration parameters CP'. The variables in this optimization method are the configuration parameters which are allowed to be changed in step S3.

In case that the threshold of the performance criterion PC is lower than 371 time segments for the system of FIG. 1, this will result in an optimization of the simulation model. In a specific example of this optimization, the adjustable design parameters in the optimization are x1, x2 and x3. For robot 1, the design parameter is x1 where the processing time of robot 1 is (8+x1) time segments. For robot 2, the design parameter is x2 where x2 is the variable position of robot 2. Moreover, there exists a further design parameter x3 for robot 2 describing that the processing time of robot 2 is (9+x3) time segments. For robot 3, its location is fixed at position 9 of the conveyor belt. Furthermore, robot 3 has a fixed processing time of 11 time segments. Analogously, the position 13 for robot 3 is fixed.

In this specific example, the deterministic optimization will result in the following changed configuration parameters:

x1: robot 1 needs 12 time segments for producing a single part 5;
x2: robot 2 is located at position 2;
x3: robot 2 needs 12 time segments for producing a single part 6.

Using this changed configuration parameters, the simulation model will result in an overall production time (for 20 products 7) of 263 segments corresponding to 16.4 rotations of the conveyor belt which is much lower than 371 segments of the basic configuration shown in FIG. 1. Based on this changed configuration parameters, the real production system will be adjusted accordingly, resulting in the configuration as shown in FIG. 5.

Figure 3:
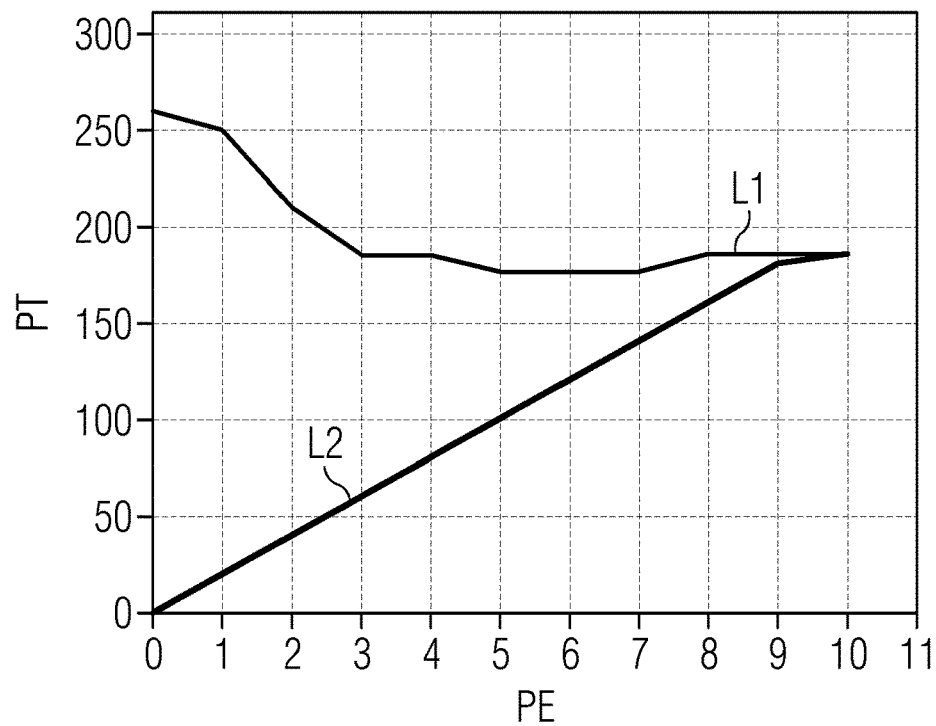
FIG. 3 and FIG. 4 are diagrams illustrating the estimation of the production time in an automation system of the type as in FIG. 1.

As mentioned above, steps S1 to S3 will be performed in regular time intervals based on the configuration parameters as well as the current state parameters of the production system which are sensed by a camera system. FIG. 3 shows a diagram illustrating an example of a change of the predicted production time PT output by the simulation model SM at corresponding processing events PE. Line L1 refers to the estimated/predicted production time whereas line L2 illustrates the already expired time for production. At each processing event PE, the above processing according to FIG. 2 is performed. Hence, the production time for 20 products is estimated at each processing event PE. Due to the continuous monitoring of the configuration of the production system in each processing event PE, the estimated processing time will change and will finally correspond to the actual production time for 20 products.

In the scenario of FIG. 3, the performance criterion was fulfilled in each processing event PE so that a change of configuration parameters based on step S3 of FIG. 2 was not performed. This is different in the scenario of FIG. 4, as will be explained in the following.

Figure 4:
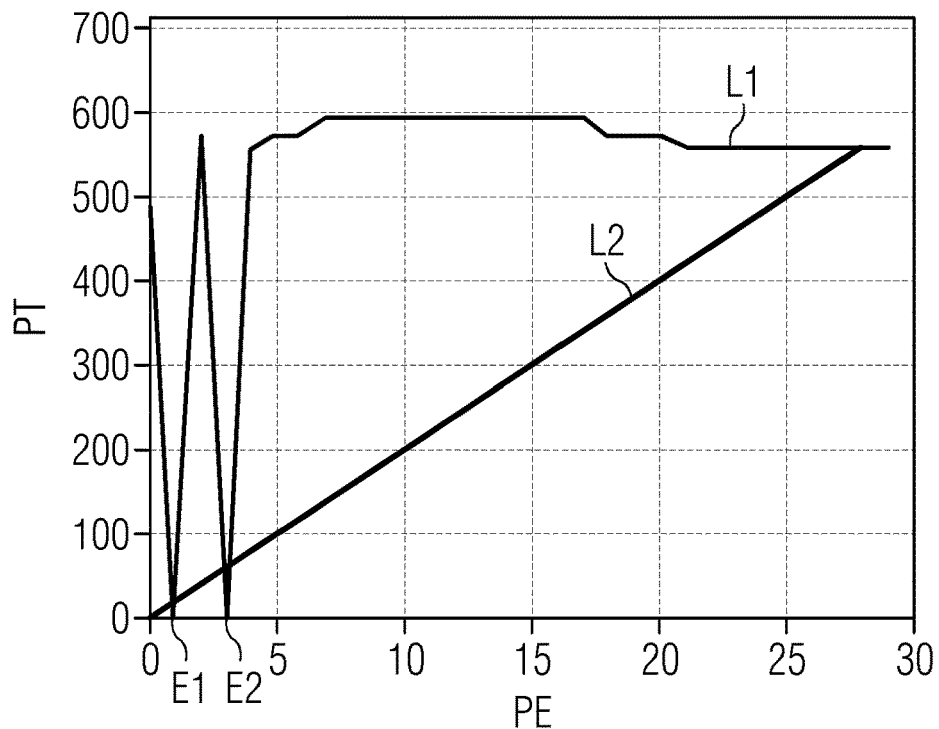

FIG. 4 shows the same type of diagram as FIG. 3 with the difference that dead locks in the form of infinite production times are predicted by the simulation model SM. Those dead locks are indicated with values of zero at corresponding processing events E1 and E2. In each of those processing events, the performance criterion PC of FIG. 2 is not fulfilled such that step S3 is performed resulting in a changed configuration of the production system with the consequence that, at the next processing event, the production time will once again comply with the performance criterion PC.

The embodiments of the invention as described in the foregoing has several advantages. Particularly, the operation of a real automation system is controlled such that undesired operational states of the system are avoided. This is achieved by a simulation model which predicts at least one performance parameter and particularly a production time at corresponding processing events. If the performance parameter does not comply with a performance criterion, the configuration of the automation system in the simulation model is adapted such that a simulation run based on the simulation model with the adapted configuration will predict a performance parameter fulfilling the performance criterion. Thereafter, the real automation system is adjusted to the adapted configuration. The embodiments of the invention provide an active control of an automation system on simulative predictions, thus avoiding situations like very long production times or dead locks resulting in a blocked production.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A method for computer-aided control of an automation system, wherein the automation system is controlled in real operation by use of a digital simulation model which simulates the automation system and which is specified by a number of configuration parameters describing the configuration of the automation system and a number of state parameters describing the operational state of the automation system, wherein the automation system includes at least one conveyor belt and at least one machine, where simulated operation runs of the automation system based on the simulation model can be performed with the aid of a computer, where a simulation run predicts a number of performance parameters of the automation system, wherein the automation system comprises a number of machines, where the one or more predetermined configuration parameters comprise for one or more of the number of machines the processing time of at least one processing step performed by the respective machine and the position of the respective machine within the automation system,
wherein the following steps are performed at each processing event of a plurality of successive predetermined processing events during the real operation of the automation system:
a) sensing the number of state parameters of the automation system in real operation and performing a simulated operation run based on the simulation model specified by the number of configuration parameters and the number of sensed state parameters;
b) if one or more predetermined performance parameters out of the number of performance parameters predicted by the simulated operation run in step a) do not fulfil a performance criterion with respect to a minimum performance of the automation system, adapting the simulation model by changing one or more predetermined configuration parameters out of the number of configuration parameters such that the one or more predetermined performance parameters predicted by a simulated operation run based on the adapted simulation model fulfil the performance criterion;
c) adjusting the one or more predetermined configuration parameters of the automation system in real operation to the changed predetermined configuration parameters determined in step b) such that the automation system avoids an undesired operational state.

2. The method according to claim 1, wherein the one or more changed predetermined configuration parameters are determined in step b) by an optimization of the simulation model, the optimization having the optimization goal of finding the optimum of the one or more predetermined performance parameters with respect to the performance criterion in dependence on the one or more predetermined configuration parameters as variables.

3. The method according to claim 2, wherein the optimization of the simulation model comprises a deterministic optimization where at least one predetermined configuration parameter has a deterministic value as variable.

4. The method according to claim 2, wherein the optimization of the simulation model comprises a probabilistic optimization where at least one predetermined configuration parameter is described by a mean value as variable and a fixed standard deviation of the mean value.

5. The method according to claim 1, wherein the one or more predetermined performance parameters comprise the production time for a number of products produced by the automation system where a necessary condition for the non-fulfilment of the performance criterion is that the production time is higher than a predetermined threshold or results in a dead lock where no more products can be produced.

6. The method according to claim 1, wherein the one or more predetermined performance parameters comprise the grade of quality for a number of products produced by the automation system where a necessary condition for the non-fulfilment of the performance criterion is that the grade of quality for the number of products is lower than a predetermined threshold.

7. The method according to claim 1, wherein the one or more predetermined performance parameters comprise the electric energy consumption of the automation system where a necessary condition for the non-fulfilment of the performance criterion is that the electric energy consumption is higher than a predetermined threshold.

8. The method according to claim 1, wherein the number of state parameters of the automation system in real operation is sensed in step a) by one or more cameras.

9. The method according to claim 1, wherein, before the start the real operation of the automation system, an optimization of the simulation model is performed, the optimization having the optimization goal of finding the optimum of the one or more predetermined performance parameters with respect to the performance criterion in dependence on the one or more predetermined configuration parameters as variables.

10. An apparatus for computer-aided control of an automation system, wherein the automation system includes at least one conveyor belt and at least one machine, wherein the apparatus is adapted to control the automation system in real operation by use of a digital simulation model which simulates the automation system and which is specified by a number of configuration parameters describing the configuration of the automation system and a number of state parameters describing the operational state of the automation system, where simulated operation runs of the automation system based on the simulation model can be performed with the aid of a computer, where a simulation run predicts a number of performance parameters of the automation system, wherein the automation system comprises a number of machines, where the one or more predetermined configuration parameters comprise for one or more of the number of machines the processing time of at least one processing step performed by the respective machine and the position of the respective machine within the automation system, wherein the apparatus comprises means to perform the following steps at each processing event of a plurality of successive predetermined processing events during the real operation of the automation system:

a) sensing the number of state parameters of the automation system in real operation and performing a simulated operation run based on the simulation model specified by the number of configuration parameters and the number of sensed state parameters;

b) if one or more predetermined performance parameters out of the number of performance parameters predicted by the simulated operation run in step a) do not fulfil a performance criterion with respect to a minimum performance of the automation system, adapting the simulation model by changing one or more predetermined configuration parameters out of the number of configuration parameters such that the one or more predetermined performance parameters predicted by a simulated operation run based on the adapted simulation model fulfil the performance criterion;

c) adjusting the one or more predetermined configuration parameters of the automation system in real operation to the changed predetermined configuration parameters determined in step b) such that the automation system avoids an undesired operational state.

11. The apparatus according to claim 10, wherein the apparatus is configured to perform a method according to claim 1 wherein the one or more changed predetermined configuration parameters are determined in step b) by an optimization of the simulation model, the optimization having the optimization goal of finding the optimum of the one or more predetermined performance parameters with respect to the performance criterion in dependence on the one or more predetermined configuration parameters as variables.

12. A computer program product with program code, which is stored on a non-transitory machine-readable carrier, for carrying out a method according to claim 1 when the program code is executed on a computer.

13. A computer having a computer program with program code stored on a non-transitory machine-readable carrier for carrying out a method according to claim 1 when the program code is executed on the computer.

* * * * *